US010965366B2

(12) United States Patent
Roos

(10) Patent No.: US 10,965,366 B2
(45) Date of Patent: Mar. 30, 2021

(54) ADAPTIVE CHANNEL SYMBOL RATE IN A SATELLITE SYSTEM

(71) Applicant: HUGHES NETWORK SYSTEMS, LLC, Germantown, MD (US)

(72) Inventor: Dave Roos, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 15/859,210

(22) Filed: Dec. 29, 2017

(65) Prior Publication Data
US 2019/0207675 A1  Jul. 4, 2019

(51) Int. Cl.
| | | |
|---|---|---|
| H04B 7/185 | (2006.01) | |
| H04B 1/707 | (2011.01) | |
| H04W 4/80 | (2018.01) | |
| H04B 1/69 | (2011.01) | |

(52) U.S. Cl.
CPC ......... *H04B 7/18597* (2013.01); *H04B 1/707* (2013.01); *H04B 7/1858* (2013.01); *H04B 7/18513* (2013.01); *H04B 1/69* (2013.01); *H04B 2201/70715* (2013.01); *H04W 4/80* (2018.02)

(58) Field of Classification Search
CPC .. H04B 7/18597; H04B 1/707; H04B 7/1858; H04B 2201/7071; H04W 4/80
See application file for complete search history.

(56) References Cited

U.S. PATENT DOCUMENTS

| | | | | |
|---|---|---|---|---|
| 6,324,184 | B1 * | 11/2001 | Hou | H04L 12/2801 370/468 |
| 8,689,062 | B2 * | 4/2014 | Xia | G11B 27/36 714/708 |
| 2002/0183057 | A1 * | 12/2002 | Thorburn | H04B 7/2045 455/427 |
| 2009/0225687 | A1 * | 9/2009 | Hart | H04L 25/0204 370/280 |
| 2013/0077514 | A1 * | 3/2013 | Dinan | H04L 5/0057 370/252 |
| 2014/0363008 | A1 * | 12/2014 | Chen | G10K 11/002 381/66 |
| 2015/0133173 | A1 * | 5/2015 | Edge | G01S 1/66 455/456.6 |
| 2015/0382375 | A1 * | 12/2015 | Bhushan | H04L 5/0005 370/252 |

(Continued)

OTHER PUBLICATIONS

International Search Report & Written Opinion in PCT/US2018/068071, dated Apr. 30, 2019.

*Primary Examiner* — Benjamin H Elliott, IV
*Assistant Examiner* — Nevena Zecevic Sandhu
(74) *Attorney, Agent, or Firm* — Jones Robb, PLLC

(57) ABSTRACT

A method and system are disclosed for adaptive channel adjustments in a satellite communication system. The maximum bandwidth for a traffic carrier used for user communication in a satellite communication system is determined during changing conditions. The maximum bandwidth is then compared to a predetermined bandwidth allocated for the traffic carrier. New transmit parameters are selected to adjust the traffic carrier bandwidth within the allocated bandwidth in order to improve capacity. All transmitters and receivers within the system are subsequently reconfigured to transmit and receive the traffic carrier using the new transmit parameters.

20 Claims, 6 Drawing Sheets

(56) References Cited

U.S. PATENT DOCUMENTS

| | | | |
|---|---|---|---|
| 2016/0066057 A1* | 3/2016 | Kao | H04H 20/12 |
| | | | 725/127 |
| 2017/0317724 A1* | 11/2017 | Khandani | H01Q 1/36 |
| 2018/0205431 A1* | 7/2018 | Nammi | H04B 7/0697 |

* cited by examiner

ADAPTIVE CHANNEL SYMBOL RATE IN A SATELLITE SYSTEM

BACKGROUND INFORMATION

Satellite communication services have become more accessible to consumers due to increased availability and reduced service costs. Satellite communication systems allow consumers to access voice and data services from virtually any global location. Such accessibility can be beneficial for consumers who are located in, or must travel to, areas that cannot be reliably serviced by normal voice and/or data communication systems. Satellite communication bandwidth, however, remains expensive relative to terrestrial wireless services. Satellite service providers, therefore, seek to utilize the most capacity available for use.

At least one factor that limits the usable capacity of the satellite is the number of filters used to remove unwanted frequency components and prevent interference with neighboring satellites. It is desirable to minimize the mass (or weight) of the satellites because the satellite must be launched into orbit. Thus, the mass of onboard components must be carefully selected. While filters can improve performance and increase the capacity of the satellite system, such filters often contribute a significant mass component to the satellite. A balance must be selected, therefore, between the satellite mass and usable capacity.

Current filters are typically constructed from aluminum in order to reduce weight. However, aluminum has a high coefficient of thermal expansion. During normal operation, temperature changes in the satellite, and filters, can fluctuate from 0° C. to 60° C. Such temperature fluctuations can adversely affect the frequency response of filters, thus resulting in variations in the usable bandwidth. Satellite vendors compensate for such fluctuations by reducing the useable bandwidth based on fluctuations in the frequency response of filters. Since the temperature variations occur regularly and over time, a significant portion of the available bandwidth goes unused. Based on the foregoing, there is a need for an approach that utilizes bandwidth allocated for variations in satellite filter frequency response resulting from temperature fluctuations.

BRIEF SUMMARY

A method and system are disclosed for adaptive channel adjustments in a satellite communication system. According to an embodiment, the system includes a first transceiver including: at least one filter for removing unwanted frequency components from a traffic carrier used for user communication, and one or more processor; and at least one additional transceiver including: at least one filter for removing unwanted frequency components from the traffic carrier, and one or more processors. The first transceiver is configured to: determine a maximum bandwidth for the traffic carrier, compare the maximum bandwidth to a predetermined bandwidth allocated for the traffic carrier, select new transmit parameters for adjusting the traffic carrier bandwidth within the allocated bandwidth to improve capacity, the new transmit parameters being selected based, at least in part, on the determined maximum bandwidth, and apply the new transmit parameters to transmit and receive the traffic carrier. The at least one additional transceivers are configured to apply the new transmit parameters to transmit and receive the traffic carrier.

According to another embodiment, the method includes: determining a maximum bandwidth for a traffic carrier used for user communication in a satellite communication system; comparing the maximum bandwidth to a predetermined bandwidth allocated for the traffic carrier; selecting new transmit parameters for adjusting the traffic carrier bandwidth within the allocated bandwidth to improve capacity, the new transmit parameters being selected based at least on the determined maximum bandwidth; and reconfiguring all transceivers to transmit and receive the traffic carrier using the new transmit parameters.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A method and system for adaptive channel adjustments in a satellite communication system are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
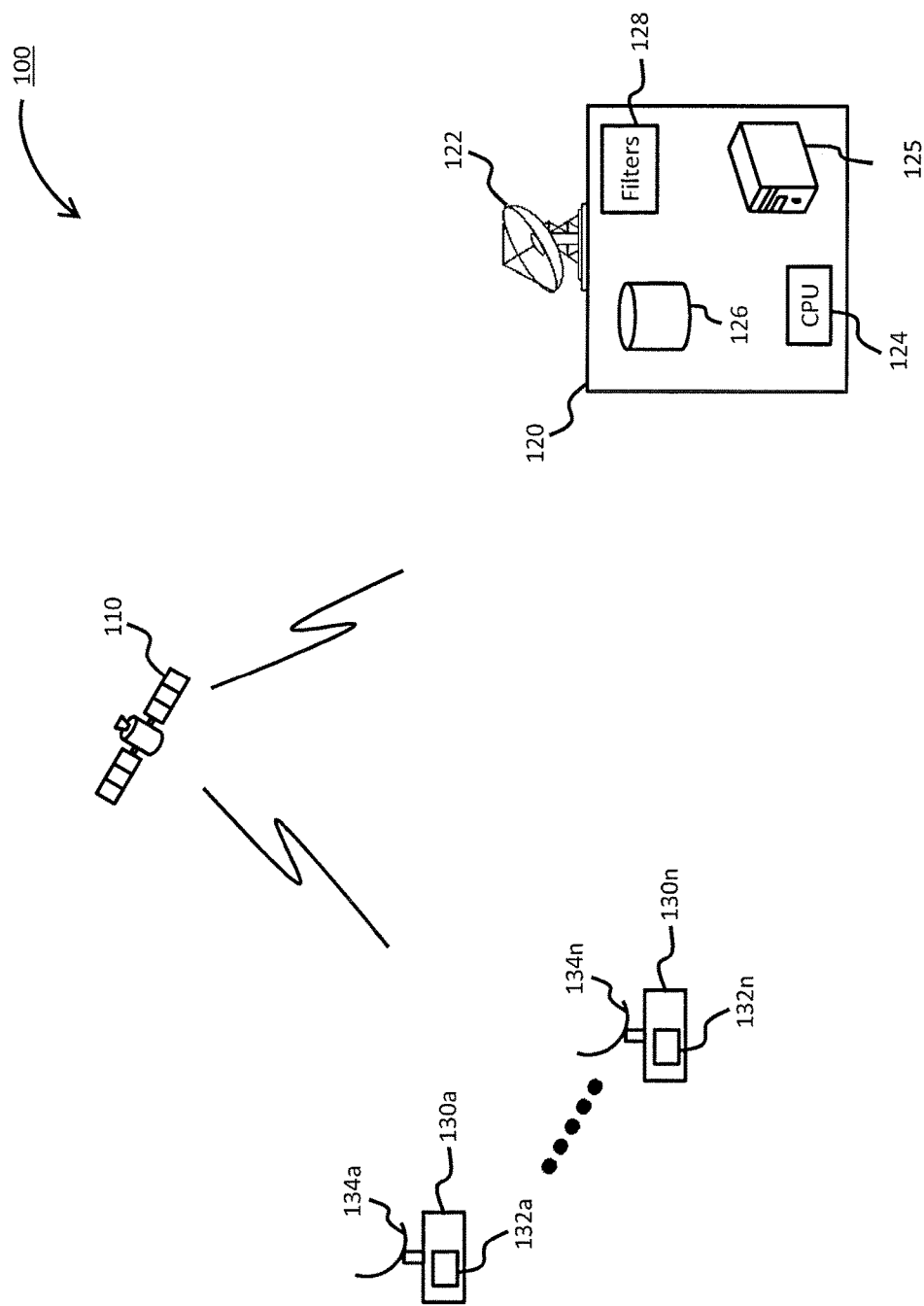
FIG. 1 is a diagram of a system capable of performing adaptive channel adjustments, according to one embodiment.

FIG. 1 is a diagram of a communication system 100 capable of performing adaptive channel adjustments, according to various exemplary embodiments. The system 100 includes a satellite 110 that supports communications among a number of gateways 120 (only one shown) and multiple satellite terminals 130a-130n. The gateway 120 can include various components to facilitate communication with the satellite 110. According to at least one embodiment, the gateway 120 can include a radio frequency (RF) transceiver 122, a processing unit 124 (or computer, CPU, etc.), and a data storage unit 126. The data storage unit 126 can be used to store and provide various access to information pertaining, in part, to operations in the satellite network.

According to other embodiments, the gateway 120 can include multiple processing units 124 and multiple data storage units 126 in order to accommodate the needs of a particular system implementation. The gateway 120 can also include one or more workstations 125 (e.g., computers, laptops, etc.) in place of, or in addition to, the processing unit 124 (or multiple processing units). According to various implementations, the processing unit 124 and/or the one or more workstations 125 are capable of executing program instructions such that they become configured to perform various functions associated with operation of the gateway 120. The gateway 120 also includes at least one filter 128 that can be used to remove frequency components from signals received at the gateway 120. Although not illustrated in FIG. 1, the satellite 110 and terminals 130 can also include multiple filters.

According to the embodiment shown in FIG. 1, the terminals 130 can be configured as very small aperture terminals (VSAT) that are capable of transmitting/receiving information to/from the satellite 110. As such, the terminals 130 include hardware such as computing units 132 (e.g., CPU, PC, laptop, server, etc.), RF transceiver 134, etc. The terminals 130 can also include additional hardware such as modulator/demodulator, physical interfaces (e.g., network interface controller), etc. that facilitate connection to external user devices.

According to various embodiments, the gateway 120 can be configured to adjust the usable channel bandwidth to increase capacity while remaining within the predefined limits of the channel. As previously discussed, satellites experience hot/cold cycles that generally repeat on a daily basis. The change in temperature causes the frequency response of the filters to shift up as the temperature decreases, while shifting down as the temperature increases. The shifts in frequency response can cause upper and/or lower frequency components of traffic carriers to be truncated. The carrier bandwidths are typically assigned such that they will not be truncated regardless of temperature fluctuations.

According to various embodiments, however, the gateway 120, dynamically monitors the predefined limits of the channel in order to determine the precise frequency response of the filters. The usable channel bandwidth is then adaptively increased while remaining within the predefined limits. For example, the filters' frequency response may shift up by a first factor under the coldest conditions, and shift down by a second factor under the hottest conditions. During the coldest conditions, the gateway 120 can adjust parameters used to transmit a traffic carrier such that its bandwidth increases based on the second factor in order to utilize the additional spectrum. In order to avoid loss of information, the gateway 120 transmits the adjusted parameters to all receivers (e.g., satellite, terminals, etc.) in the system. The gateway 120 can also adjust the center frequency of the traffic carrier to allow the widest spectrum signal to pass through the satellite filters.

The gateway 120 can perform various operations to determine maximum bandwidth that can be used under current conditions prior to actually transmitting the traffic carrier. For example, a test carrier can be transmitted to the receiver and adjusted until the bandwidth limits can be detected. The test carrier can be initially configured with a conservatively sized bandwidth that will facilitate proper reception by the receiver. Once received, the various analysis is performed to determine whether the bandwidth can be increased, or whether the test carrier has suffered some signal truncation. According to various implementations, a fast Fourier transform (FFT) can be performed, and parts (or all) of the resulting spectrum used to evaluate possible truncation loss. The gateway 120 can also periodically transmit the test signal to allow measurement of parts of, or the entire bandpass characteristics of the channel, by the receiver. Furthermore, the transmitter could send a known wideband subcarrier superimposed on the traffic carrier and at very low level relative to the traffic carrier. The wideband signal could subsequently be detected and analyzed instead of the traffic carrier and the results used to adjust parameters of the traffic current carrier. The results of the analysis are subsequently sent back to the gateway 120. The bandwidth can further be increased until the signal begins to degrade. The signal degradation can be based on the signal to noise ratio, bit error rate, etc.

Once the gateway 120 has assessed the maximum usable bandwidth, specific parameters can be determined for transmitting the traffic carrier. The parameters are also transmitted to all receivers in the system 100. According to at least one embodiment, the options for bandwidth and center frequency can be limited to a small number so that the receiver will only need to consider only a small number of variations when searching for the traffic carrier. Alternatively, the receiver can analyze the wideband test carrier and deduce the traffic carrier settings. The gateway 120 (i.e., transmitter) can also encode the current bandwidth and frequency settings onto the wideband test carrier, which is then demodulated by the receiver. The settings can then be used to search for the traffic carrier. According to a further implementation, the bandwidth and center frequency of the traffic carrier can be periodically switched to a center frequency and bandwidth that are known to be receivable by all receivers. New bandwidth and center frequency settings can then be transmitted, and all receivers (and transmitters) would switch to those settings. For example, a preset interval and common parameters can be established for the system. The preset interval can be selected to be 10, 20, 30, 40, 50, 60 seconds, etc. Furthermore the preset interval can be set to begin at specific times, such as on the hour, quarter hour, etc.

Figure 2:
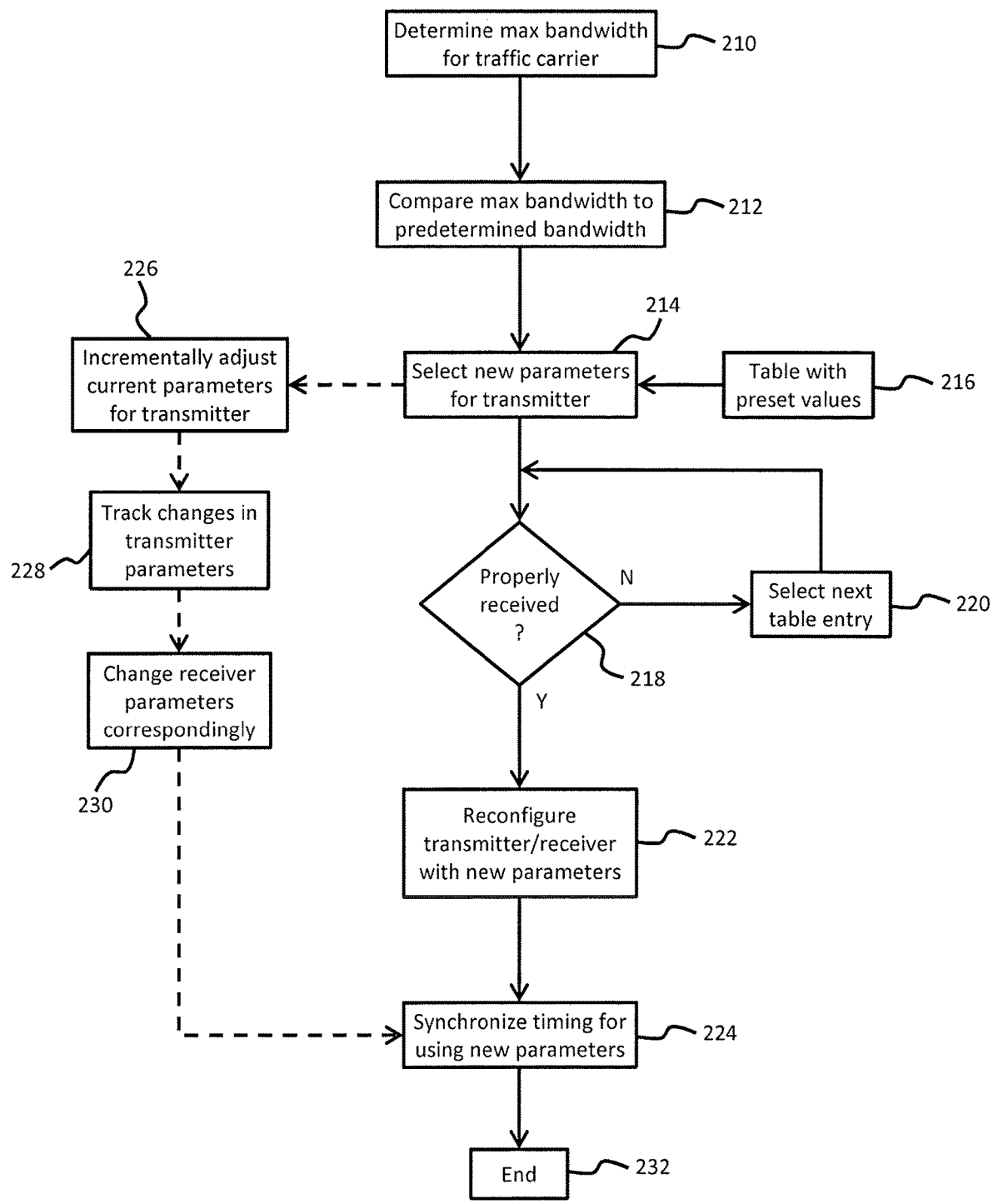
FIG. 2 is a flowchart of a process for performing adaptive channel adjustments, according to one or more embodiments.

FIG. 2 is a flowchart of a process for performing adaptive channel adjustments, according to one or more exemplary. At 210, a maximum bandwidth is determined for the traffic carrier. As previously discussed, the maximum bandwidth for the traffic carrier can vary depending on receiver conditions. Satellites utilize lightweight materials to construct filters and other components in order minimize the total system mass that must be launched into orbit. In particular, satellites are subject to a wide range of temperatures which can affect performance of filters within the satellite. Filters located in ground-based receivers can also subject to temperature variations that can adversely affect filter performance. Such variations can reduce the maximum bandwidth that is available for the test carrier.

At 212, the maximum bandwidth for the traffic carrier is compared to a predetermined bandwidth. According to at least one embodiment, the predetermined bandwidth can correspond to the actual bandwidth allocated for the traffic carrier. For example, the space for the traffic carrier may be leased from the satellite vendor. Additionally, a particular amount of bandwidth may be requested as part of the lease agreement. Accordingly, the satellite vendor can incorporate a margin within the predetermined bandwidth in order to guarantee service to the client with a specified level of quality. Thus, the predetermined bandwidth that has been allocated for the carrier can include a margin, or overhead, designed to ensure that the same capacity is available to the client despite system variations such as fluctuations in filter performance due to temperature variations.

At 214, new parameters are selected for the transmitter. According to at least one embodiment, the new parameters can be selected such that the bandwidth of the traffic carrier can be adjusted to improve capacity, while also remaining within the predetermined bandwidth that has been allocated. According to at least one embodiment, the system can include a table containing preset values for the parameters to be used by the transmitter. According to such embodiments, the new parameters would be selected by choosing an entry within the table. This is indicated at 216.

Depending on the specific implementation, the preset values can be organized within the table such that they correspond with variations in filter temperature. For example, the first entry in the table can correspond to the lowest temperature experience by the filter. Subsequent entries can correspond to incremental temperature increases for the filter. The final entry in the table can further correspond to the highest temperature that the filter is expected to experience. Each entry can include, for example, distinct parameters such as symbol rate, coding, etc. for transmitting the traffic carrier.

At 218, it is determined whether the traffic carrier was properly received. More particularly, the receiver would utilize its current settings and parameters in an attempt to demodulate the traffic carrier received from the transmitter. If the traffic carrier is not properly received, or the error rate exceeds an acceptable level, control passes to 220. The receiver would then select the next entry from the table. The receiver subsequently applies the parameters and attempts to demodulate the signal (or traffic carrier) received from the transmitter. Control would then return to 218 where it would be against determined whether the traffic carrier was properly received. According to the illustrated embodiment, the process would continue until the receiver selects an appropriate entry from the table which allows the traffic carrier to be properly received.

If the traffic carrier is properly received, control passes to 222 where the transmitter and receiver are reconfigured with the new parameters. Accordingly, subsequent transmission and reception of the traffic carrier would be performed using the new parameters. According to at least one embodiment, the transmitters and receivers within the system can be configured to synchronize the timing when the new parameters will be applied. For example, the synchronization can be based on a specific time, such as the top of each hour. Alternatively, the synchronization can be based on frame and/or burst transmissions between the transmitter and receivers. Thus, at 224, the transmitters and receivers within the system can select the exact timing for applying the new parameters in order to avoid any loss of user data. The process would then end at 232.

According to at least one embodiment, rather than using a table with preset values for the parameters, the transmitter can incrementally adjust its current parameters and transmit the traffic carrier. This is indicated at 226. By incrementally adjusting its current parameters, the transmitter would transmit the traffic carrier with only a small variation relative to the previous parameters. Such incremental adjustments would allow the receiver to properly receive the traffic carrier while only incurring minimal error rates. The receiver would, therefore, receive the signal but also detect the variations resulting from the adjustments made by the transmitter. At 228, the receiver tracks the changes in the transmitter parameters. Thus, the receiver would be aware of increases and decreases in some of the parameters utilized by the transmitter to transmit the traffic carrier. At 230, the receiver changes its own parameters to correspond with the changes that have been tracked for the traffic carrier. Control would then pass to 224 where the timing for using the new parameters would be synchronized.

According to at least one embodiment, once the receiver applies the corresponding changes to its parameters, the timing does not need to be synchronized. More particularly, since the transmitter is making incremental changes that are being tracked by the receiver, the parameters used by the transmitter and receiver will be in relative synchronization without the need to expressly negotiate a time for using the new parameters. Thus, the traffic carrier would be properly received regardless of the changes made by the transmitter.

Figure 3:
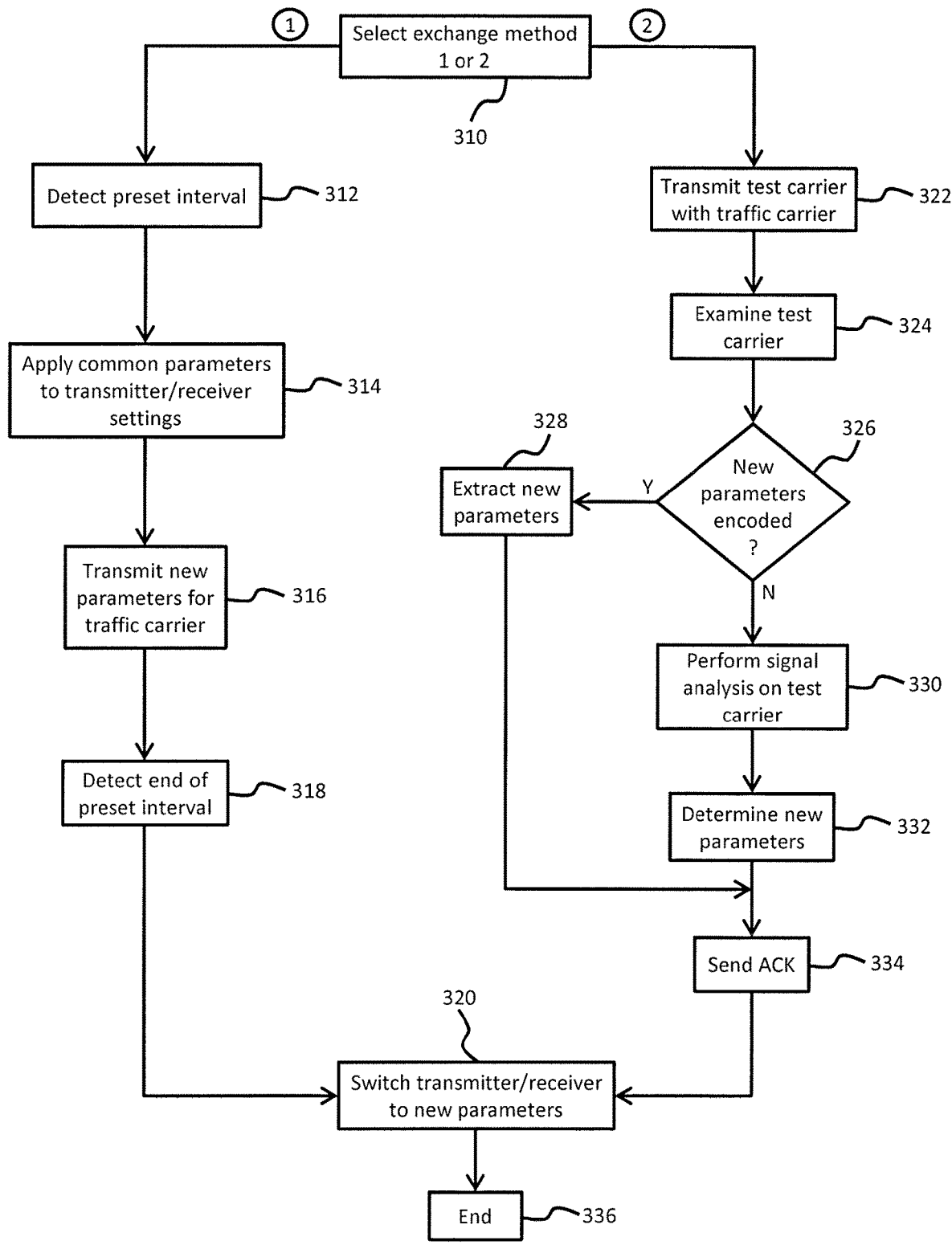
FIG. 3 is a flowchart of a process for exchanging new parameters for transmitting and receiving, according to at least one embodiment.

FIG. 3 is a flowchart of a process for exchanging new parameters for transmitting and receiving, according to at least one embodiment. At 310, a method is selected for exchanging parameters to be used by the transmitters and receivers within the system. While FIG. 3 illustrates 2 options for exchanging parameters, it should be noted that various other options may be available depending on the specific implementation. For example, options such as a table of predetermined parameters, or incrementally changing the transmitter parameters can also be made available. If exchange method 1 is selected, control passes the 312, where a preset time interval is detected. According to an embodiment, the preset interval can be a fixed time period that occurs regularly. For example, the preset interval can begin at the top of every hour and have a duration of 10 seconds, 30 seconds, 1 minute, etc.

At 314, the transmitter and receiver settings are switched to a set of common parameters. According to at least one embodiment, the common parameters can be selected such that the traffic carrier is capable of being properly received regardless of any frequency fluctuations resulting from filtered temperature changes. The common parameters are also static and do not vary. Accordingly, upon detecting the preset interval all transmitters and receivers within the system would switch to have the same parameters for transmitting and receiving. At 316, new parameters for the traffic carrier are transmitted. More particularly, if the transmitter determines that the capacity can be increased by changing the parameters used to transmit the traffic carrier, the new parameters would be transmitted to all receivers at 316. At 318, the end of the preset interval is detected. For example, if the preset interval is defined to occur at the top of every hour with a 1 minute interval, the end of the preset interval would be reached at 1 minute past the hour. Control would then pass to 320 where the transmitter and receiver switch to the new parameters for transmitting and receiving the traffic carrier.

According to the illustrated embodiment, if the second exchange method is selected, control passes the 322. The transmitter superimposes a test carrier within the traffic carrier and transmits the signal. At 324, the receiver examines the traffic carrier. At 326, the receiver determines whether or not the new parameters for transmitting the traffic carrier have been encoded in the test carrier. If the test carrier contains new parameters, then control passes to 328 where the receiver extracts the new parameters. Alternatively, if the receiver determines that the new parameters were not encoded within the test carrier, a signal analysis is performed on the test carrier at 336. Depending on the specific implementation, the signal analysis can determine various properties of the test carrier in order to identify the specific parameters used by the transmitter when transmitting the test carrier.

According to the illustrated embodiment, the receiver can send an acknowledgment message (ACK), at 334, to the transmitter in order to confirm that the new parameters have been either extracted from the test carrier or deduced from analyzing the test carrier. The acknowledgment message can further include the specific parameters which the receiver believes were intended to be applied to receive the traffic carrier. According to such embodiments, the transmitter may further return an acknowledgment signal to the receiver to confirm that the new parameters are accurate. At 320, the transmitter and receiver are switched to utilize the new parameters for transmitting and receiving the traffic carrier. The process ends at 336.

Figure 4:
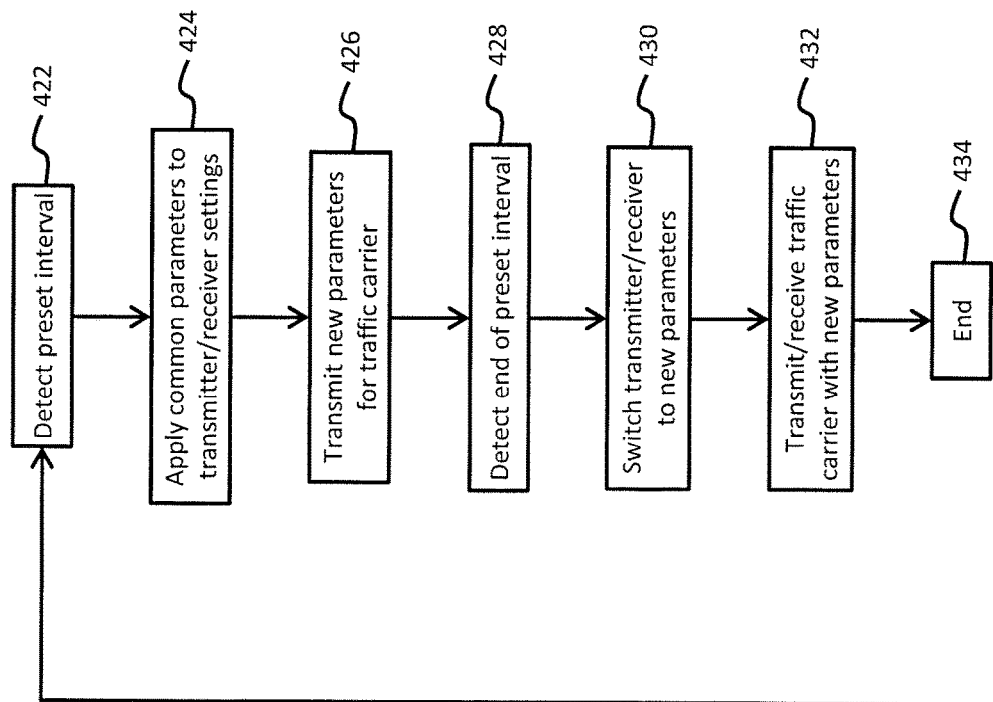
FIG. 4 is a flowchart of a process for performing adaptive channel adjustments, according to various exemplary embodiments.
Figure 4:
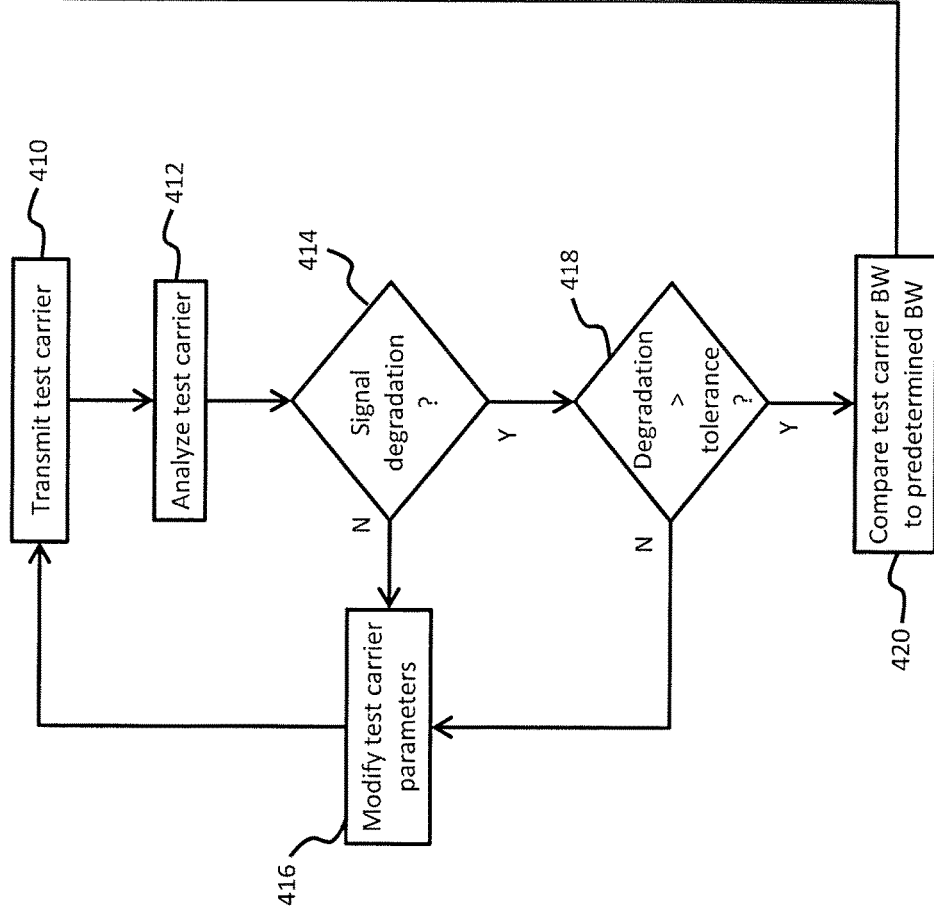

FIG. 4 is a flowchart of a process for performing adaptive channel adjustments, according to various exemplary embodiments. At 410, a test carrier is transmitted from the transmitter. As previously discussed, the test carrier can be selected such that it has properties which allow it to be properly received regardless of the conditions within the receiver. Furthermore, depending on the specific implementation, the test carrier can be configured as a swept sine wave that is transmitted at preset intervals, a wideband signal, a low-power wideband spread spectrum signal, etc. At 412, the test carrier is analyzed by the receiver. At 414, it is determined whether any signal degradation has occurred. The signal degradation can result, for example, from filter truncation of the signal if the temperature fluctuations cause variations in filter performance. If no signal degradation is detected, control passes to the 416. The transmitter modifies parameters used to transmit the test carrier. Control would then return to the 410 where the test carrier is transmitted with the modified parameters.

According to one or more embodiments, the transmitter may determine that an upper end of the frequency spectrum has been truncated by the filter, while the lower end remains intact. Furthermore, the bandwidth of the test carrier may be within the allocated bandwidth for the traffic carrier. Under such circumstances, the transmitter may simply adjust the center frequency of the test carrier to align it within the predetermined bandwidth. The transmitter may also adjust other parameters in order to reduce the bandwidth of the test carrier such that it will pass through the allocated bandwidth within an acceptable level of tolerance. For example, the modulation type, shape of the transmitter filter, or other transmission parameters could also be adjusted in a manner similar to that described. While the foregoing parameters are indicated as being modified to adjust the bandwidth of the test carrier, it should be noted that various additional parameters could be modified in order to adjust the bandwidth of the test carrier. Accordingly, such parameters are only intended to be illustrative, and in no way restrictive.

If signal degradation is detected, then control passes to 418. It is determined whether the level of degradation exceeds a preset tolerance level. If the amount of signal degradation does not exceed the tolerance level, then control passes to 416 and the parameters of the test carrier are modified by the transmitter. If the level of signal degradation exceeds the tolerance level, control passes to 420 where the test carrier bandwidth is compared to the predetermined bandwidth in order to ensure the signal will not be truncated by the receiver filters. According to the illustrated embodiment, a preset interval is used for exchanging parameters for transmitting the traffic carrier. Thus, at 422, the preset interval is detected.

At 424, the settings of all transmitters and receivers within the system are switched to the common parameters. Thus, regardless of the previous parameters that were in use, the common parameters are applied during the preset interval. At 426, the new parameters to be applied for transmitting and receiving the traffic carrier are transmitted. Depending on the specific implementation, the new parameters may correspond to the last used parameters if no environmental changes have occurred within the system. At 428, the end of the preset interval is detected. As previously discussed, the preset interval can occur at fixed times and last for a fixed duration. At 430, all transmitters and receivers within the system switch to utilize the new parameters. At 432, the traffic carrier is transmitted and received using the new parameters. The process ends at 434.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described receivers, transmitters, transceivers, gateway, etc. Additionally, such hardware can be interfaced to connect and/or facilitate communication between different components such as the automobile infotainment system and receiver.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 5:
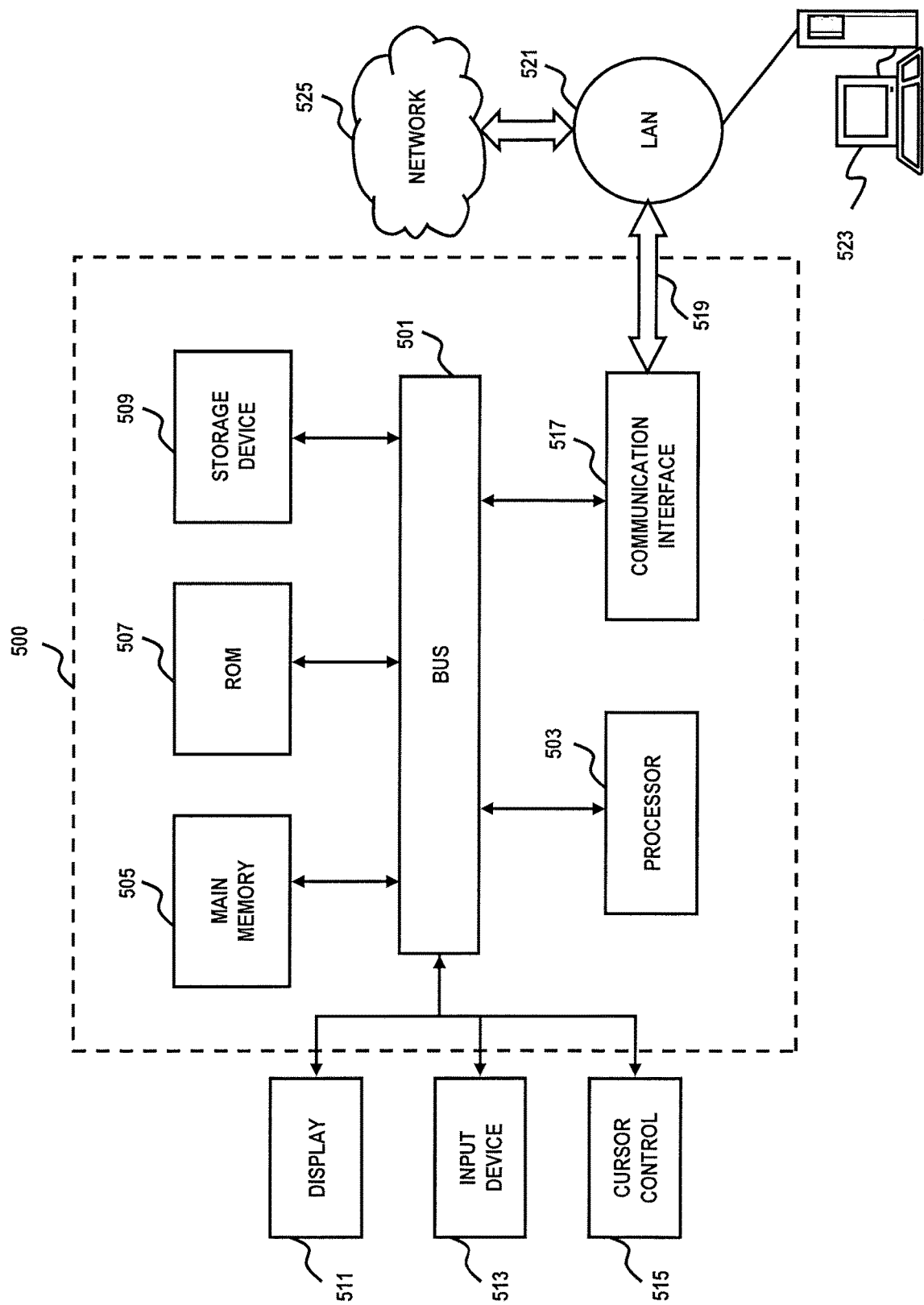
FIG. 5 is a diagram of a computer system that can be used to implement various exemplary embodiments.

FIG. 5 is a diagram of a computer system that can be used to implement features of various embodiments. The computer system 500 includes a bus 501 or other communication mechanism for communicating information and a processor 503 coupled to the bus 501 for processing information. The computer system 500 also includes main memory 505, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a light emitting diode (LED) or other flat panel displays, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511. Additionally, the display 511 can be touch enabled (i.e., capacitive or resistive) in order facilitate user input via touch or gestures.

According to an exemplary embodiment, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement exemplary embodiments. Thus, exemplary embodiments are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a High Definition Multimedia Interface (HDMI), etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 such as a wide area network (WAN) or the Internet. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an exemplary embodiment through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Non-volatile media can further include flash drives, USB drives, microSD cards, etc. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 6:
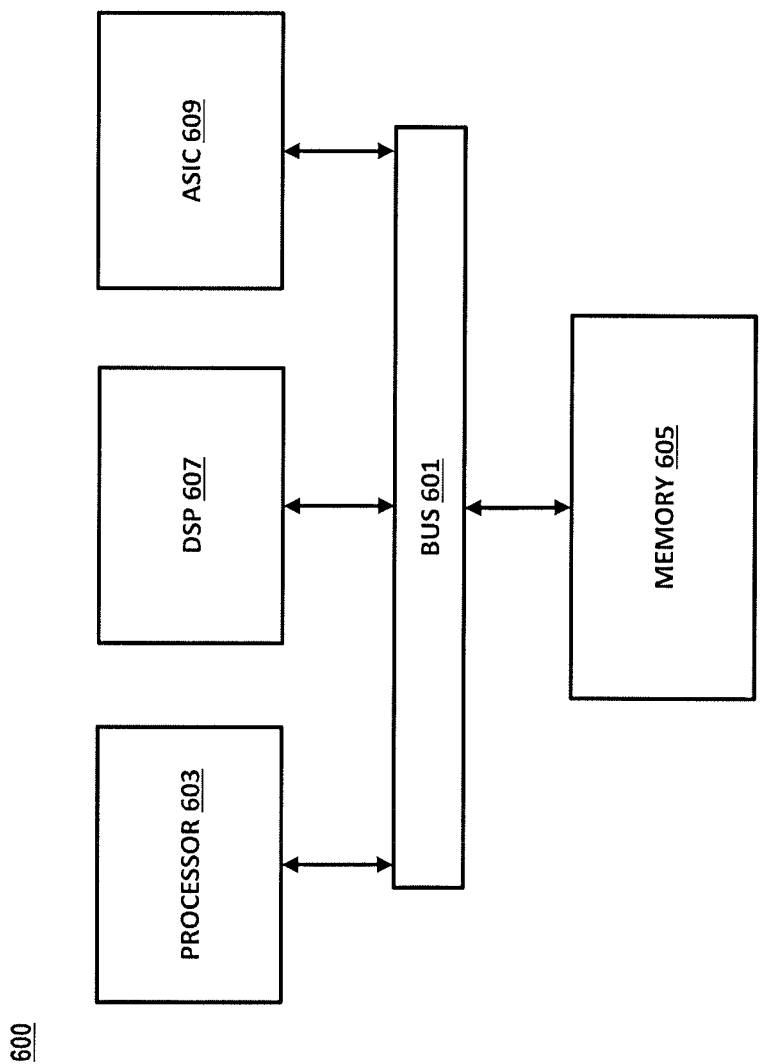
FIG. 6 is a diagram of a chip set that can be used to implement various exemplary embodiments.

FIG. 6 illustrates a chip set 600 upon which features of various embodiments may be implemented. Chip set 600 is programmed to implement various features as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of the figures.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 605 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   determining a maximum bandwidth for a traffic carrier used for user communication in a satellite communication system using a test carrier configured as swept sine wave, a low power wideband spread spectrum signal, or a wideband signal, wherein the test carrier is transmitted by a predetermined gateway in the satellite communication system, and wherein the determined maximum bandwidth results from temperature fluctuations at a satellite of the satellite communication system;
   comparing the determined maximum bandwidth to a predetermined bandwidth allocated for the traffic carrier;
   selecting new transmit parameters for adjusting the determined maximum bandwidth within the predetermined bandwidth to improve capacity, the new transmit parameters being selected if the determined maximum bandwidth is less than the predetermined bandwidth; and
   reconfiguring all transceivers communicating with the predetermined gateway to apply the new transmit parameters for transmission and reception of the traffic carrier,
   wherein the transceivers communicate with the predetermined gateway via the satellite.

2. The method of claim 1, wherein:
   the new transmit parameters are selected from a plurality of preset values; and
   each transceiver is configured to receive the traffic carrier using subsequent transmit parameters from the plurality of preset values, if the traffic carrier cannot be demodulated using current transmit parameters.

3. The method of claim 1, wherein selecting the new transmit parameters comprises:
   incrementally adjusting current transmit parameters to obtain the new transmit parameters; and
   tracking changes in the new transmit parameters, and correspondingly applying the new transmit parameters to demodulate the traffic carrier.

4. The method of claim 1, wherein reconfiguring all transceivers further comprises establishing a protocol for exchanging messages between transceivers to synchronize timing for applying the new transmit parameters to transmit and receive the traffic carrier.

5. The method of claim 1, wherein:
   selecting the new transmit parameters comprises:
      transmitting the traffic carrier at preset intervals using common transmit parameters, and
      transmitting the new transmit parameters for the traffic carrier during the preset intervals; and
   reconfiguring all transceivers comprises applying the new transmit parameters to receive the traffic carrier after the preset interval has elapsed.

6. The method of claim 1, wherein the test carrier is configured as a wideband test carrier and selecting the new transmit parameters comprises:
   transmitting the wideband test carrier superimposed with the traffic carrier;
   analyzing the wideband test carrier; and
   selecting the new transmit parameters based, at least in part, on the analysis.

7. The method of claim 1, wherein the test carrier is configured as a wideband test carrier and selecting the new transmit parameters comprises:
   transmitting the wideband test carrier superimposed with the traffic carrier;
   encoding the new transmit parameters within the wideband test carrier; and
   extracting the new transmit parameters from the wideband test carrier.

8. The method of claim 1, wherein determining the maximum bandwidth further comprises:
   transmitting a test carrier having a predetermined bandwidth suitable for reception under varying receiver conditions;
   analyzing the test carrier to identify signal degradation resulting from filter truncation;
   modifying at least one of a center frequency, bandwidth, modulation type, and matched filter characteristic of the test carrier, if the signal degradation is within a prescribed tolerance; and
   repeating the transmitting, analyzing, and modifying until the signal degradation exceeds the prescribed tolerance.

9. The method of claim 8, wherein the test carrier is configured as swept sine wave transmitted at preset intervals.

10. The method of claim 8, wherein the test carrier is configured as a low power wideband spread spectrum signal superimposed with the traffic carrier.

11. A system comprising:
   a gateway for a satellite communication system comprising:
      a first transceiver including at least one filter for removing unwanted frequency components from a traffic carrier used for user communication, and
      one or more processors; and
   at least one terminal, each terminal comprising:
      an additional transceiver including at least one filter for removing the unwanted frequency components from the traffic carrier, and
      one or more processors,
   wherein the gateway is configured to:
      determine a maximum bandwidth for the traffic carrier using a test carrier configured as swept sine wave, a low power wideband spread spectrum signal, or a wideband signal, wherein the determined maximum bandwidth results from temperature fluctuations at a satellite of the satellite communication system, compare the determined maximum bandwidth to a predetermined bandwidth allocated for the traffic carrier, select new transmit parameters for adjusting the determined maximum bandwidth within the predetermined bandwidth to improve capacity, the new transmit parameters being selected if the determined maximum bandwidth is less than the predetermined bandwidth, and applying the new transmit parameters to the first transceiver to transmit the traffic carrier, wherein the at least one terminal is configured to apply the new transmit parameters to the additional transceiver to transmit and receive the traffic carrier, and wherein the at least one terminal communicates with the gateway via the satellite.

12. The system of claim 11, wherein:

the gateway is configured to select the new transmit parameters for the first transceiver from a plurality of preset values; and the at least one terminal is configured to receive the traffic carrier by applying subsequent transmit parameters to the additional transceiver from the plurality of preset values, if the traffic carrier cannot be demodulated using current transmit parameters.

13. The system of claim 11, wherein:

the gateway is configured to incrementally adjust current transmit parameters of the first transceiver to obtain the new transmit parameters; and the at least one terminal is configured to track changes in the new transmit parameters, and correspondingly apply the new transmit parameters to the additional transceiver to demodulate the traffic carrier.

14. The system of claim 11, wherein the gateway and the at least one terminal are configured to exchange messages for applying the new transmit parameters to transmit and receive the traffic carrier, using a predetermined protocol.

15. The system of claim 11, wherein:

the gateway is configured to select the new transmit parameters by:

applying common transmit parameters to the first transceiver;

transmitting the traffic carrier at preset intervals using the common transmit parameters, and transmitting the new transmit parameters for the traffic carrier during the preset intervals; and the gateway and the at least one terminal are configured to apply the new transmit parameters to transmit and receive the traffic carrier after the preset interval has elapsed.

16. The system of claim 11, wherein the test carrier is configured as a wideband test carrier, and the gateway is configured to select the new transmit parameters by:

transmitting the wideband test carrier superimposed with the traffic carrier;

receiving an analysis of the wideband test carrier from the at least one terminal, the analysis including at least properties of the wideband test carrier; and selecting the new transmit parameters based, at least in part, on the analysis.

17. The system of claim 11, wherein:

the test carrier is configured as a wideband test carrier;

the gateway is configured to select the new transmit parameters by:

transmitting the wideband test carrier superimposed with the traffic carrier, and encoding the new transmit parameters within the wideband test carrier; and the at least one terminal is configured to extract the new transmit parameters from the wideband test carrier.

18. The system of claim 11, wherein the gateway is configured to determine the maximum bandwidth by:

transmitting a test carrier having a predetermined bandwidth suitable for reception under varying receiver conditions;

receiving an analysis of the test carrier that includes, in part, information indicative of signal degradation resulting from filter truncation;

modifying at least one of a center frequency, bandwidth, modulation type, and matched filter characteristic of the test carrier, if the signal degradation is within a prescribed tolerance; and repeating the transmitting, analyzing, and modifying until the signal degradation exceeds the prescribed tolerance.

19. The system of claim 18, wherein the test carrier is configured as a swept sine wave transmitted at preset intervals.

20. A system comprising:

a first transceiver comprising:

at least one filter for removing unwanted frequency components from a traffic carrier signal used for user communication in a satellite communication system, and one or more processors; and at least one additional transceiver comprising:

at least one filter for removing the unwanted frequency components from the traffic carrier signal, and one or more processors, wherein the first transceiver is configured to:

determine a maximum bandwidth for the traffic carrier signal using a test carrier configured as swept sine wave, a low power wideband spread spectrum signal, or a wideband signal, wherein the determined maximum bandwidth results from temperature fluctuations at a satellite of the satellite communication system, compare the determined maximum bandwidth to a predetermined bandwidth allocated for the traffic carrier signal, select new transmit parameters for adjusting the determined maximum bandwidth within the allocated bandwidth to improve capacity, the new transmit parameters being selected if the determined maximum bandwidth is less than the predetermined bandwidth, and apply the new transmit parameters to transmit and receive the traffic carrier signal, wherein the at least one additional transceiver is configured to apply the new transmit parameters to transmit and receive the traffic carrier signal, and wherein the at least one additional transceiver communicates with the first transceiver via the satellite.

* * * * *